United States Patent Office 3,342,550
Patented Sept. 19, 1967

3,342,550
AMMONIA-HYDROGEN ISOTOPIC EXCHANGE
PROCESS
Yves Bourgeois, Vermelles, Bernard Lefrançois, Noeux-les-Mines, and Charles Moreau, Faches-Thumesnil, France, assignors to Houilleres du Bassin du Nord et du Pas-de-Calais—Commissariat à l'Energie Atomique —Compagnie de Construction Mecanique, Procedes Sulzer and l'Air Liquide, Societe pour l'Etude et l'Exploitation des Procedes Georges Claude, Douai, Nord, and Paris, Seine, France
Filed Mar. 26, 1964, Ser. No. 355,026
2 Claims. (Cl. 23—193)

This invention is concerned with improvements in or relating to the ammonia-hydrogen isotopic exchange process.

Figure 1:
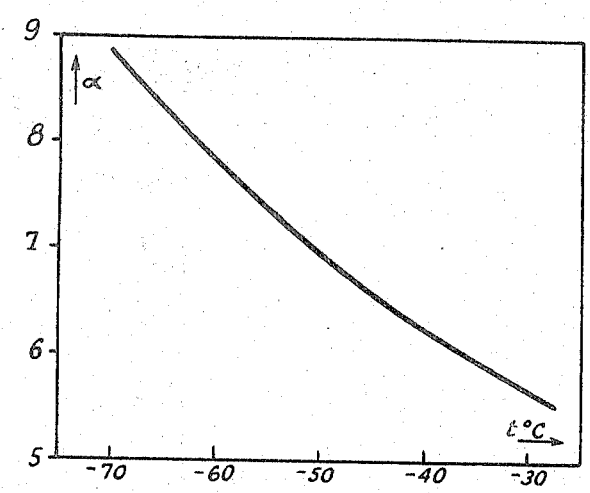

It is known to use a catalyst soluble in the liquid medium in ammonia-hydrogen isotopic exchange processes in order to increase the exchange reaction rate, and an alkali metal amide is most often used for this purpose. It is also known that the isotopic exchange coefficient increases as the temperature at which the exchange occurs is reduced; however, a limit to this temperature reduction is set, in the usual processes, by the crystallisation temperature of the solutions used. For instance, the exchange coefficient between pure liquid ammonia and gaseous hydrogen is 6.95 at −50° C. and is 8.35 at −65° C., while the solubility of potassium amide, which is a catalyst, varies from 190 g./kg. of ammonia to 30 g./kg. of ammonia between the same temperatures. FIGURE 1 of the accompanying drawings shows how the $NH_3/H_2$ isotopic exchange coefficient varies with temperature.

We have found as a result of systematic experiments that it is possible to provide a considerable increase in the solubility in liquid ammonia of an alkali metal amide catalyst.

According to the present invention we provide an ammonia-hydrogen isotopic exchange process, in which the liquid medium contains an alkali metal amide as catalyst and a soluble nitrite to increase the solubility of said amide in the liquid medium. The nitrite is preferably an alkali metal nitrite, the alkali metal being the same as that of the amide catalyst, i.e., potassium nitrate is advantageously used when potassium amide is used as the catalyst.

The following examples are given by way of illustration only:

At −30° C., the solubility of potassium amide alone in ammonia is 650 g./kg., the figure increasing to 970 g./kg. if 360 g. of potassium nitrite are added per kg. of ammonia. There is a further increase in solubility to 1,121 g./kg. of ammonia if 675 g. of potassium nitrite are added per kg. of ammonia.

Figure 2:
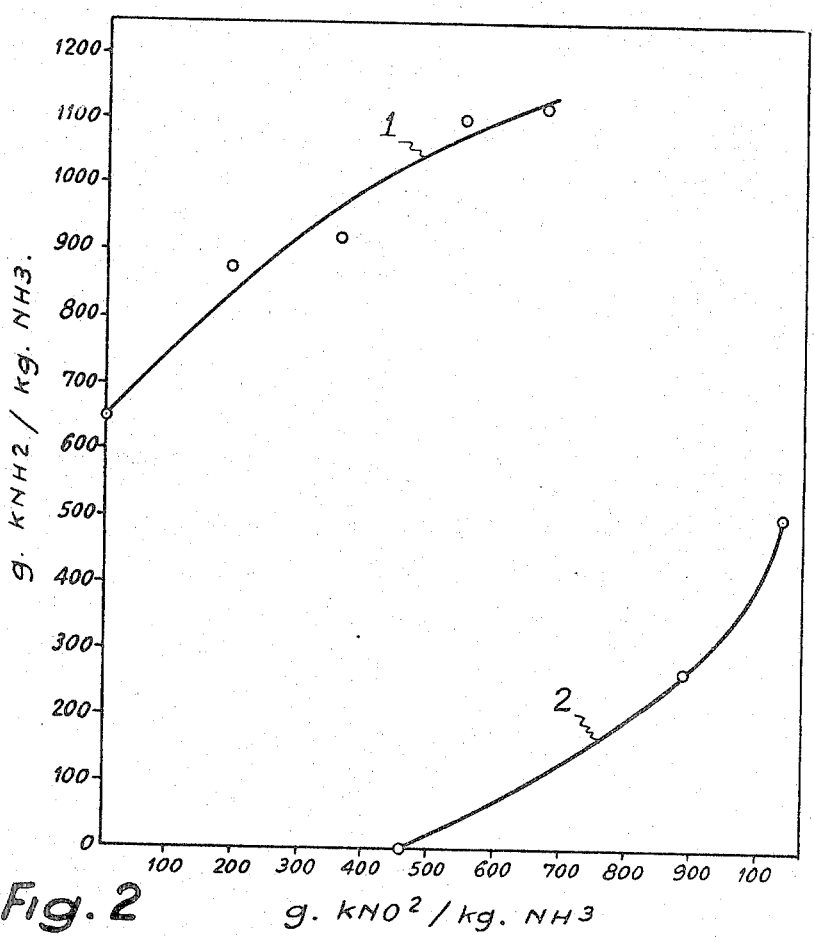

FIGURE 2 of the accompanying drawings shows the results achieved at −30° C. Curve 1 shows the variation in the solubility of $KNH_2$ as a function of the $KNO_2$ content. Curve 2 shows the variation in the solubility of $KNO_2$ as a function of the $KNH_2$ content; the two curves were obtained with ammonia at −30° C., the concentration in g. of $KNO_2$ per kg. of $NH_3$ being plotted along the abscissa axis while the concentration in g. of $KNH_2$ per kg. of $NH_3$ is plotted along the ordinate axis.

To the same end, the following table shows the drop in crystallisation temperature as a function of the potassium amide and potassium nitrite concentrations.

| $KNO_2$ g./kg. $NH_3$ | $KNH_2$ g./kg. $NH_3$ | | | |
|---|---|---|---|---|
| | 59° C. | 158° C. | 235° C. | 410° C. |
| 150 | ΔT=10 | 8 | 4 | 4 |
| 300 | | 15 | 8 | 8 |
| 450 | | 21 | 13 | 13 |
| 600 | | 26 | 17 | 17 |

It has been found, however, from other comparative experiments that the addition of potassium bromide has substantially no effect upon the solubility of potassium amide in the liquid medium. For instance, it was found that:

A solution of potassium amide above, at a concentration of 599 g./kg. of ammonia crystallises at −31.5° C.;

A solution containing 597 g. of $KNH_2$/kg. of ammonia and 17.9 g. of KBr/kg. of ammonia crystallises at −33.5° C.;

A solution of potassium amide alone, at a concentration of 776 g./kg. of ammonia, crystallises at −26° C.;

A solution containing 776 g. of $KNH_2$/kg. of ammonia and 13.1 g. of KBr/kg. of ammonia crystallises at −27° C.

A study of the results of all the experiments we have carried out shows that nitrites give the best results for the required purpose and that potassium nitrite is the best salt for solubilising alkali metal amides in liquid ammonia.

The use of a nitrite according to the invention to increase the solubility of alkali metal amides in ammonia enables increased amide contents to be used at low temperatures, and thereby increases the ammonia-hydrogen isotopic exchange coefficient. For instance, by means of the invention solutions containing 59 g. of potassium amide per kg. of ammonia can be used at −70° C., at which temperature the exchange coefficient between pure gaseous hydrogen and pure liquid ammonia is 8.85. It is impossible in the prior art processes to go down to such a low temperature, since crystallisation starts at −60° C., at which temperature the exchange coefficient is only 7.80.

Also, in the known processes wherein a monothermic isotopic exchange is carried out, for instance, of the kind described in French patent specification 1,237,166, the catalyst can be recycled after evaporation. The isotopic short circuit produced by the solution ammonia is reduced in proportion as the concentration of catalyst is greater in the evaporator, but according to the invention the concentration level can be greatly increased by the voluntary addition of a nitrite.

What we claim is:

1. In an ammonia-hydrogen isotopic exchange process wherein the exchange is carried out in liquid ammonia employing an alkali metal amide as catalyst, the improvement of dissolving an alkali metal nitrite in said liquid ammonia to increase the solubility of said alkali metal amide therein.

2. A process as claimed in claim 1 in which said alkali metal amide is potassium amide and said alkali metal nitrite is potassium nitrite.

References Cited
UNITED STATES PATENTS
3,214,243  10/1965  Lazard et al. _____ 23—193

OTHER REFERENCES
Holliday et al.: Inorganic Chemistry in Non-Aqueous Solvents, 1965 (pp. 10–12).

Audrieth et al.: Non-Aqueous Solvents, 1953, pp. 45–48.

Waddington: Non-Aqueous Solvent System, 1965, pp. 19–22.

OSCAR R. VERTIZ, *Primary Examiner.*

J. J. BROWN, H. S. MILLER, *Assistant Examiners.*